(12) United States Patent
Monajemi et al.

(10) Patent No.: US 8,510,005 B1
(45) Date of Patent: Aug. 13, 2013

(54) PID-BASED TORQUE PHASE CONTROL OF A POWER DOWNSHIFT

(75) Inventors: Dara Monajemi, Lansing, MI (US); Mark David Kieliszewski, Lake Orion, MI (US); Todd J. Thor, Byron, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/552,972

(22) Filed: Jul. 19, 2012

(51) Int. Cl.
*G07F 7/00* (2006.01)

(52) U.S. Cl.
USPC .......................................................... 701/67

(58) Field of Classification Search
USPC .......................................................... 701/67
See application file for complete search history.

(56) References Cited

U.S. PATENT DOCUMENTS

| | | | |
|---|---|---|---|
| 2005/0107936 A1* | 5/2005 | Keyse et al. | 701/58 |
| 2009/0018735 A1* | 1/2009 | Whitton | 701/55 |
| 2012/0232766 A1* | 9/2012 | Einfinger | 701/67 |

* cited by examiner

*Primary Examiner* — James Trammell
*Assistant Examiner* — Michael D Lang
(74) *Attorney, Agent, or Firm* — Quinn Law Group, PLLC

(57) ABSTRACT

A method for controlling the torque phase of a clutch-to-clutch power downshift in a vehicle includes determining, during a near-sync boost (NSB) state of the power downshift, a synchronization speed. The method includes estimating, via a controller, a feed-forward clutch pressure that holds a speed of the turbine at the synchronous speed, and then ramping a clutch pressure command to the oncoming clutch to the calculated feed-forward clutch pressure. Closed-loop proportional-integral-derivative (PID) control is initiated over the clutch pressure command during the NSB phase in response to a predetermined PID activation event. A vehicle includes an engine, transmission, torque converter, and a controller. The controller has a processor and memory on which instructions embodying the above method are recorded. Execution of the instructions by the processor causes the controller to execute the method.

19 Claims, 2 Drawing Sheets

PID-BASED TORQUE PHASE CONTROL OF A POWER DOWNSHIFT

TECHNICAL FIELD

The present disclosure relates to control of the torque phase of a power downshift in an automatic transmission using proportional-integral-derivative (PID) control.

BACKGROUND

An automatic transmission includes gear elements and clutches that may be used to execute a power downshift event. During a downshift, a transmission controller transfers torque from an offgoing clutch to an oncoming clutch to thereby shift the transmission to a lower gear. The controller ensures that a clutch associated with the current speed ratio in a clutch-to-clutch downshift, i.e., with the off-going clutch, releases while a clutch associated with a desired new speed ratio, i.e., with the on-coming clutch, smoothly engages. Turbine speed rises until the clutch speeds are synchronized, a value that is referred to as the sync speed. During the inertia phase of the downshift, the clutches slip and the speed ratio changes. The speed ratio does not change in the ensuing torque phase. Transmission output torque increases as the transmission shifts into the lower gear.

SUMMARY

A method is disclosed herein for controlling the torque phase of a power downshift using proportional-integral-derivative (PID)-based control. The present approach improves the quality of a power downshift while reducing calibration complexity. PID control is selectively used to establish closed-loop feedback control over the shift event in conjunction with open-loop/feed-forward clutch pressure control. This occurs only during a specific state of the torque phase of the downshift, i.e., the near-sync boost (NSB) state as described in detail herein. Use of the PID-based control during the NSB state provides a self-correcting, closed-loop approach to achieving and maintaining synchronization speed (sync speed) of the clutches used for executing the clutch-to-clutch power downshift.

In particular, a method is disclosed herein for controlling the torque phase of a clutch-to-clutch power downshift in a vehicle having a transmission with a pair of clutches used to execute the clutch-to-clutch shift. The method includes determining the sync speed during the NSB state of the power downshift. The NSB state is a portion of the torque phase prior to the clutches reaching synchronous speed. Additionally, the method includes estimating, via a controller, a feed-forward clutch pressure that holds a speed of the turbine at the synchronous speed. Thereafter, the method includes ramping a clutch pressure command to the oncoming clutch to the calculated feed-forward clutch pressure. Closed-loop PID control is then selectively established over the clutch pressure command during the NSB state in response to a predetermined PID activation event.

A vehicle is also disclosed herein. The vehicle includes an engine, an automatic transmission driven by the engine and having an oncoming and an offgoing clutch used for executing the clutch-to-clutch power downshift, and a controller. The controller, which is in communication with the transmission, executes the method noted above.

Additionally, a system is disclosed for a vehicle. The system includes a transmission and a controller. The transmission includes first and second clutches, and also an input shaft that is connectable to a drive shaft of an engine of the vehicle. The controller includes a processor and a tangible, non-transitory memory device on which is recorded instructions for executing a method for controlling the torque phase of a clutch-to-clutch power downshift of the transmission using the method set forth above.

The above features and advantages and other features and advantages of the present invention are readily apparent from the following detailed description of the best modes for carrying out the invention when taken in connection with the accompanying drawings.

DETAILED DESCRIPTION

Figure 1:
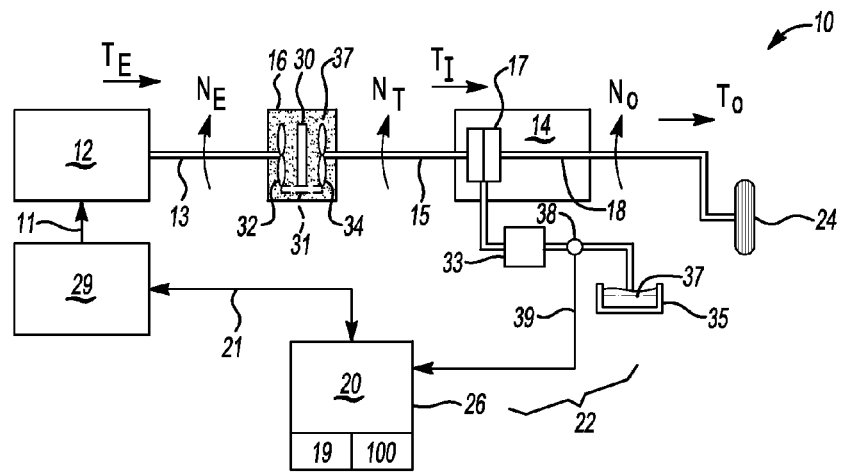
FIG. 1 is a schematic illustration of an example vehicle having an automatic transmission and a controller that uses proportional-integral-derivative (PID)-based control logic to control a torque phase of a power downshift.
Figure 4:
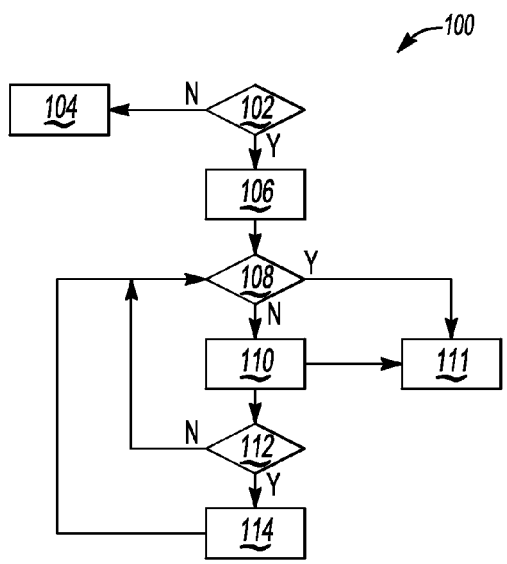
FIG. 4 is a flow chart describing an example method for controlling the torque phase of a power downshift in the vehicle of FIG. 1.

Referring to the drawings, an example vehicle 10 is shown in FIG. 1 that includes an automatic transmission 14 and a transmission controller 26. The controller 26 is configured to execute instructions embodying the present method 100, an example of which is shown in FIG. 4 and explained below. Execution of the method 100 enables the controller 26 to control a clutch-to-clutch power downshift of the transmission 14. The controller 26 selectively uses proportional-integral-derivative (PID) control logic 25 in addition to open-loop, feed-forward clutch pressure control in order to achieve and maintain speed synchronization of a set of clutches 17 used during the particular downshift event disclosed herein. The present approach is intended to reduce the calibration complexity normally associated with lookup table-based calibration of a clutch-to-clutch downshift while also providing an improved shift feel.

The vehicle 10 may include an internal combustion engine 12. An engine drive shaft 13 rotates at engine speed ($N_E$) and delivers engine torque ($T_E$) to a hydrodynamic torque converter 16. The torque converter includes a turbine 34 that is connected to a transmission input shaft 15, and that causes the input shaft 15 to rotate at turbine speed (arrow $N_T$). A stator 30 is positioned between a pump 32 and the turbine 34. A torque converter clutch 31 may be used to selectively lock the pump 32 to the turbine 34 above a threshold lockup speed, as will be understood by those of ordinary skill in the art. Thus, input torque ($T_I$) is delivered via the torque converter 16 to the transmission 14 via the input shaft 15. An output shaft 18 of the transmission 14 rotates at an output speed ($N_O$), and ultimately conveys transmission output torque ($T_O$) from the various clutches 17 and associated gear sets of the transmission 14 to a set of drive wheels 24.

The transmission 14 of FIG. 1 may be configured as any multi-speed transmission, such as a 6-speed or an 8-speed transmission. Thus, the clutches 17, which include at least an offgoing and an oncoming clutch for the particular downshift maneuver being executed as noted above, may be selectively engaged and disengaged as needed using electro-hydraulic controls (not shown). Fluid 37 drawn from a sump 35 by a fluid pump 33 may be used to provide the required line pressure within the transmission 14. A temperature sensor 38 may be used to measure the temperature of the fluid 37, and to communicate the measured temperature (arrow 39) to the controller 26. As noted below with reference to FIG. 4, the measured temperature (arrow 39) may be used by the controller 26 for various control purposes, including calculating the required gains for the PID control logic 25.

The controller 26 shown in FIG. 1 selectively executes the present method 100, for instance by executing computer code or instructions recorded on tangible, non-transitory memory 20, during a power downshift maneuver. The controller 26 may include elements such as a processor 19. The memory 20 may include read only memory (ROM), electrically-programmable read-only memory (EPROM), flash memory, etc. The controller 26 may also include sufficient transitory memory, e.g., random access memory (RAM).

Memory 20 may include the PID control logic 25 noted above, one or more high-speed clocks, timers, analog-to-digital (A/D) circuitry, digital-to-analog (D/A) circuitry, a digital signal processor, and the necessary input/output (I/O) devices and other signal conditioning and/or buffer circuitry. The controller 26 specifically uses the PID control logic 25 to optimize the power downshift as explained below.

As is well understood in the art, PID control refers to a specific closed-loop feedback approach and associated logic using three control terms: a proportion (P) term, an integral (I) term, and a derivative (D) term. Each term represents the respective correction factor based on error values of the particular variable being controlled. Gain values are thus associated with each term.

A typical PID-based control approach generates a feed-forward control term (U) into a plant or system being controlled, e.g., the transmission 14 of FIG. 1. The U term may be calculated using the following equation:

$$U = K_P \cdot e + K_I \cdot \int e \cdot dt + K_D \frac{de}{dt}$$

where $K_P$, $K_I$, and $K_D$ represent the respective calibrated proportional, integral, and derivative gains, and wherein e is the calculated closed-loop error feedback term.

Still referring to the example vehicle 10 of FIG. 1, the vehicle 10 may include an engine control unit (ECU) 29 either as a separate device as shown or partially/fully integrated with the controller 26. In any embodiment, the controller 26 is in communication with the ECU 29 via a communication channel 21, with the ECU 29 providing engine control values (arrow 11) to the engine 12 as needed. For instance, the controller 26 may request a specific level of engine torque from the ECU 29 during a given shift maneuver, with the ECU 29 responding via any suitable means by increasing or reducing engine torque ($T_E$) as needed.

Figure 2:
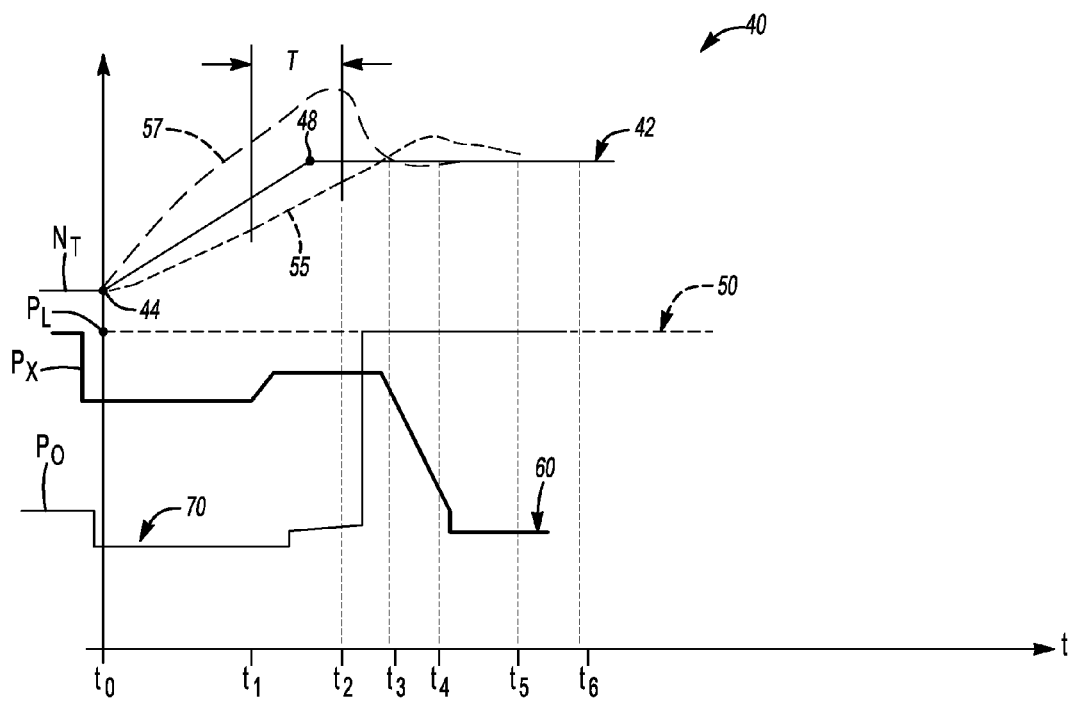
FIG. 2 is a time plot of a transmission control values for the vehicle of FIG. 1, with the amplitude of the values depicted on the vertical axis and time depicted on the horizontal axis.

Referring to FIG. 2, a set of control values 40 is plotted versus time (t), with time (t) represented on the horizontal axis and the amplitude of the various values 40 represented on the vertical axis. The control values 40 include turbine speed ($N_T$), i.e., the rotational speed of the turbine 34 shown in FIG. 1, as well as offgoing clutch pressure ($P_X$), line pressure ($P_L$), and oncoming clutch pressure ($P_O$). The offgoing and oncoming pressure commands are represented as traces 60 and 70, respectively, while turbine speed ($N_T$) is represented by trace 42. Line pressure ($P_L$) is indicated by line 50. The NSB state occurs within the range (T).

With respect to turbine speed (trace 42), sometime before $t_0$ the controller 26 of FIG. 1 commands execution of a power downshift in response to a driver's action. After a short delay, turbine speed (trace 42) ramps up from a first speed point 44 associated with a higher gear to a second speed point 48 associated with a lower gear. At the second speed point 48, turbine speed (trace 42) levels out or gradually declines at a calibrated rate.

In FIG. 2, the inertia phase of the power downshift occurs between $t_0$ and $t_1$. At about $t_1$ and continuing until about $t_2$, the transmission 14 enters the torque phase. More precisely, the transmission 14 enters an early stage of the torque phase in a state referred to hereinafter as near-sync boost (NSB). As the name implies, the NSB state is used during the torque phase at speeds close to sync speed in order to "boost" or assist the normal shift progression. The remainder of the torque phase of the shift begins at about $t_2$ after the NSB state is complete.

Proper speed synchronization of the clutches 17 of FIG. 1, i.e., the offgoing and oncoming clutches used to execute a clutch-to-clutch downshift, is required for smooth entry into the torque phase. During execution of the method 100, the controller 26 thus selectively activates the PID logic 25 of FIG. 1 to thereby achieve and maintain sync speed during the NSB state. As sync occurs at about the second speed point 48 of FIG. 2, PID-based control may be enacted at or after about $t_1$.

Once sync speed has been held for a calibrated interval, as represented by interval ($t_1$, $t_2$) in FIG. 2 for a "normal" shift as described below with reference to FIG. 3, the controller 26 allows transition to the torque phase. In the example of FIG. 2, the downshift shift is complete at about $t_4$, whereupon the controller 26 drops the offgoing clutch pressure (trace 60) to a calibrated return spring pressure for that clutch. Oncoming clutch pressure (trace 70) quickly rises after sync has been achieved, or just after $t_2$ in the example shown in FIG. 2.

Figure 3:
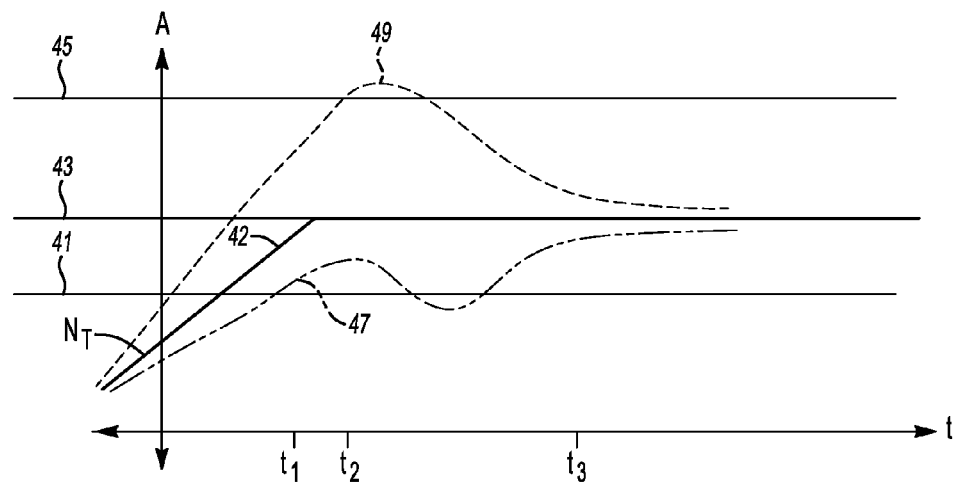
FIG. 3 is a time plot of turbine speed that illustrates an optional approach that temporarily freezes a pressure command transmitted to an oncoming clutch in a power downshift.

Referring to FIG. 3, in an optional approach the controller 26 may selectively freeze the pressure command to the oncoming clutch so as to prevent undesirable interference by that clutch during the NSB state in the operation of the closed-loop PID control. Example control values 140 each represent turbine speeds associated with three possible shift outcomes: a normal shift, a long shift, and a short shift. The terms normal, long, and short as used herein are relative. That is, the term "normal" as used herein describes a downshift having an expected completion time, while "long" and "short" respectively describes shifts that take longer and shorter than expected to complete, with any expected values being calibrated for the particular transmission being used.

In FIG. 3, line 43 represents a target value for turbine speed ($N_T$), i.e., trace 42 A normal shift may see turbine speed (trace 42) ramping to the target value (line 43) by an expected time, e.g., $t_2$. A short shift may finish earlier than expected, i.e., before $t_2$, and thus produces a turbine speed trace 49, while a long shift may finish later, i.e., closer to $t_3$, and thus produces a turbine speed trace 47. The times $t_1$, $t_2$, and $t_3$ are illustrative within the example of FIG. 3, and are not intended to represent the same time increments represented in FIG. 2.

Using the optional approach shown in FIG. 3, the controller 26 of FIG. 1 may establish a high threshold 45 and a low threshold 41 for turbine speed ($N_T$). As a possible control action, the controller 26 may temporarily freeze the oncoming pressure ($P_O$ of FIG. 2) if turbine speed ($N_T$) exceeds the high threshold 45, a condition indicated by trace 47. Likewise, the controller 26 may freeze the oncoming clutch pressure if turbine speed ($N_T$) does not at least exceed the low threshold 41. As part of the control action, the controller 26 may temporarily prevent the oncoming pressure ($P_O$), e.g., trace 70 of FIG. 3, from ramping up during the NSB state (T) and the subsequent torque phase, thus preventing this command from interfering with closed-loop PID control during the NSB phase (T) as shown in FIG. 2.

Referring again to FIG. 2, traces 55 and 57 represent two example turbine speed profiles. As part of the method 100 discussed below, the controller 26 may utilize digital or analog timers to determine if turbine speed ($N_T$) is sufficiently stable and remains so over a calibrated duration. The controller 26 may ensure that the transmission 14 of FIG. 1 enters the torque phase of the downshift only after the calibrated duration has elapsed. That is, the elapsed time indicates that the speeds of the oncoming and offgoing clutches (clutches 17 of FIG. 1) remain synchronized for a sufficient amount of time, thus eliminating the possibility that the controller 26 acts on a transient event rather than on true synchronization. For instance, trace 55 may have a corresponding calibrated stability interval of ($t_3$, $t_4$), while trace 57 may have an interval of ($t_5$, $t_6$). These intervals may be the same, e.g., 100 ms.

Referring to FIG. 4 in conjunction with the structural elements of the vehicle 10 shown in FIG. 1, an example method 100 for controlling a power downshift in the vehicle 10 begins at step 102, wherein the controller 26 processes a set of entry criteria. Step 102 entails determining whether or not to end active slip control of the clutches 17 during the power downshift. For instance, the controller 26 may consider the rate of acceleration of the turbine 34, and/or may verify that a calibrated timer has not expired. The end result of step 102 is a determination by the controller 26 that the speeds of the oncoming and offgoing clutches have approached sync speed, e.g., the second speed point 48 of FIG. 2, but have not yet arrived at that point. The method 100 proceeds to step 104 if these entry criteria have not been met. If the entry criteria have been met, the method 100 proceeds instead to step 106.

At step 104, the controller 26 continues to execute slip control during the inertia phase of the downshift, and repeats step 102 until slip control is no longer required. While not shown in FIG. 4 for illustrative clarity, if at any point a driver of the vehicle 10 requests additional engine output torque, the controller 26 may cease execution of the method 100 and proceed with the requested upshift.

At step 106, the controller 26 enters the region of the NSB state (T) shown in FIG. 2. Step 106 entails calculating, via the processor 20, the approximate feed-forward clutch pressure for holding turbine speed at synchronous speed. The method 100 proceeds to step 108 once the controller 26 has determined the clutch pressure required to reach sync speed.

At step 108, the controller 26 determines whether sync speed has been maintained for a calibrated duration, or alternatively whether sync has timed out. The latter may be likewise timer-based, such determining whether sync has been achieved within an expected duration. The controller 26 executes step 111 if either condition is true. Otherwise, the controller 26 determines that the NSB state remains active, and proceeds instead to step 110.

At step 110, the controller 26 next calculates the required feed-forward clutch pressure and begins ramping oncoming clutch pressure to achieve this pressure. The method 100 then proceeds to step 112.

At step 112, the controller 26 determines whether a predetermined PID activation event has occurred. Execution of step 112 serves to selectively initiate PID control, i.e., closed-loop feedback control, in conjunction with feed-forward control within the NSB state only in response to certain criteria. Example criteria considered at step 112 may include starting another timer to determine if sync has not been achieved in a calibrated time. Alternatively, the controller 26 may determine if the actual shift time has exceeded a desired shift time, or if the clutches 17 have not otherwise synched, which may be determined by measuring turbine speed and comparing the measured speed to a predicted turbine speed for sync. The method 100 proceeds to step 114 if any of these PID activation events has occurred. Otherwise, the controller 26 may repeat step 108.

At step 114, the controller 26 applies closed-loop PID control over the oncoming pressure command using the PID logic 25 of FIG. 1. As part of step 114, the controller 26 may adjust the P, I, and D gains, i.e., the values $K_P$, $K_I$, and $K_D$ noted elsewhere above, as a function of the measured temperature (arrow 39) of the fluid 37. Gain adjustment may occur in real-time during the shift, or it may be conducted between shifts. The controller 26 then repeats step 108.

Using the method 100 as set forth above, clutch synchronization is controlled during a power downshift in a single state, i.e., near-sync boost or NSB state, using a mixture of closed-loop and open-loop feedback controls. Such an approach may improve shift quality while reducing the amount of iterative calibration required of the conventional multi-state, open-loop, feed forward controls.

While the best modes for carrying out the invention have been described in detail, those familiar with the art to which this invention relates will recognize various alternative designs and embodiments for practicing the invention within the scope of the appended claims.

The invention claimed is:

1. A method for controlling the torque phase of a clutch-to-clutch power downshift in a vehicle having a transmission and a torque converter, the method comprising:
   determining, during a near sync boost (NSB) state of the power downshift, a synchronization speed of an offgoing clutch and an oncoming clutch of the transmission, wherein the NSB state is a portion of the torque phase that occurs prior to the offgoing and oncoming clutches reaching synchronous speed (sync speed);
   estimating, via a controller, a feed-forward clutch pressure that holds a turbine speed of the torque converter at the sync speed;
   ramping a clutch pressure command to the oncoming clutch to the estimated feed-forward clutch pressure; and
   initiating closed-loop proportional-integral-derivative (PID) control over the clutch pressure command during the NSB state in response to a predetermined PID activation event.

2. The method of claim 1, further comprising:
   exiting the NSB state only when the sync speed has been maintained for a calibrated time.

3. The method of claim 1, further comprising:
   exiting the NSB state when the oncoming clutch pressure has not reached the calculated feed-forward pressure within a calibrated duration.

4. The method of claim 1, wherein the PID activation event includes a determination, by the controller, that an actual shift time exceeds a desired shift time.

5. The method of claim 1, wherein the PID activation event includes a determination by the controller that an elapsed time since the onset of the NSB state exceeds a threshold.

6. The method of claim 1, further comprising:
   exiting PID control when the clutch speeds are synchronized for a calibrated duration.

7. The method of claim 1, further comprising:
comparing the turbine speed to a calibrated upper and lower threshold; and
temporarily freezing a pressure command to an oncoming clutch during the clutch-to-clutch shift when turbine speed falls outside of a range defined by the upper and lower thresholds.

8. The method of claim 1, further comprising:
measuring the temperature of a fluid used for actuating the clutches; and
using the controller to adjust the proportional, integral, and derivative gains of the PID control logic as a function of the measured temperature.

9. The method of claim 8, wherein the adjustment of the gains occurs in real-time during execution of the downshift.

10. A vehicle comprising:
an internal combustion engine having a drive shaft;
a transmission having an input shaft;
a torque converter having a pump and a turbine, wherein the pump is connected to the drive shaft and the turbine is connected to the input shaft; and
a controller having a processor and tangible, non-transitory memory on which is recorded instructions for executing a method for controlling the torque phase of a clutch-to-clutch power downshift in the vehicle;
wherein execution of the instructions by the processor causes the controller to:
determine, during a near sync boost (NSB) state of the power downshift, a synchronization speed of an offgoing clutch and an oncoming clutch of the transmission, wherein the NSB state is a portion of the torque phase that occurs prior to the offgoing and oncoming clutches reaching synchronous speed (sync speed);
estimate, via a controller, a feed-forward clutch pressure that holds a turbine speed of the torque converter at the sync speed;
ramp a clutch pressure command to the oncoming clutch to the estimated feed-forward clutch pressure; and
initiate closed-loop proportional-integral-derivative (PID) control over the clutch pressure command during the NSB state in response to a predetermined PID activation event.

11. The vehicle of claim 10, wherein the controller is configured to exit the NSB state when the sync speed has been maintained for a calibrated time.

12. The vehicle of claim 10, wherein the controller is configured to exit the NSB state when the oncoming clutch pressure has not reached the calculated feed-forward pressure within a calibrated duration.

13. The vehicle of claim 10, wherein the controller is configured to determine, as the PID activation event, that an actual shift time exceeds a desired shift time.

14. The vehicle of claim 10, wherein the controller is configured to determine, as the PID activation event, that an elapsed time since the onset of the NSB state exceeds a threshold.

15. The vehicle of claim 10, wherein the controller exits PID control when the clutch speeds are synchronized for a calibrated duration.

16. The vehicle of claim 10, wherein the controller is configured to:
compare the turbine speed to a calibrated upper and lower threshold; and
temporarily freeze a pressure command to an oncoming clutch during the clutch-to-clutch shift when turbine speed falls outside of a range defined by the upper and lower thresholds.

17. The vehicle of claim 10, further comprising a temperature sensor positioned in a fluid used for actuating the clutches used in the downshift event, wherein the controller is configured to:
receive the measured temperature of the fluid from the sensor; and
adjust the proportional, integral, and derivative gains of the PID control logic during the downshift as a function of the received measured temperature.

18. A system for a vehicle, comprising:
a transmission having a first and a second clutch, and also having an input shaft that is connectable to a drive shaft of an engine; and
a controller having a processor and a tangible, non-transitory memory device on which is recorded instructions for executing a method for controlling the torque phase of a clutch-to-clutch power downshift in the vehicle, wherein the first clutch acts as an offgoing clutch and the second clutch acts as an oncoming clutch during the power downshift;
wherein execution of the instructions by the processor causes the controller to:
determine, during a near sync boost (NSB) state of the power downshift, a synchronization speed of the offgoing and oncoming clutch of the transmission, wherein the NSB state is a portion of the torque phase that occurs prior to the offgoing and oncoming clutches reaching a synchronous speed;
estimate, via a controller, a feed-forward clutch pressure that holds a turbine speed of the torque converter at the synchronous speed;
ramp a clutch pressure command to the oncoming clutch to the estimated feed-forward clutch pressure; and
initiate closed-loop proportional-integral-derivative (PID) control over the clutch pressure command during the NSB state in response to a predetermined PID activation event.

19. The system of claim 18, wherein further comprising a temperature sensor in communication with the controller, and wherein the controller is configured to:
receive, from the temperature sensor, a measured temperature of a fluid used for actuating the clutches; and
adjust the proportional, integral, and derivative gains of the PID control logic in real-time during the downshift as a function of the received measured temperature.

* * * * *